United States Patent [19]

Doversberger

[11] 4,012,081
[45] Mar. 15, 1977

[54] VALVE AND RESPONSIVE CIRCUIT FOR ANTI-SKID HYDRAULIC BRAKING SYSTEM

[75] Inventor: Richard A. Doversberger, Peoria, Ill.

[73] Assignee: Westinghouse Air Brake Company, Pittsburgh, Pa.

[22] Filed: Oct. 22, 1975

[21] Appl. No.: 624,984

[52] U.S. Cl. ............................................... 303/115
[51] Int. Cl.$^2$ ......................................... B60T 8/04
[58] Field of Search ................... 188/181 A, 181 C; 303/21 F, 10, 11, 115

[56] References Cited

UNITED STATES PATENTS

| | | | |
|---|---|---|---|
| 3,467,441 | 9/1969 | Clark et al. ................... | 303/21 FM |
| 3,493,271 | 2/1970 | Douglas ........................... | 303/21 F |
| 3,690,736 | 9/1972 | Smirl et al. ................... | 303/21 FM |

Primary Examiner—Duane A. Reger
Attorney, Agent, or Firm—Leydig, Voit, Osann, Mayer & Holt, Ltd.

[57] ABSTRACT

An anti-skid hydraulic braking system for a vehicle having the usual wheel cylinders, master cylinder and brake pedal, with a brake release valve interposed ahead of each wheel cylinder for selectively reducing the pressure in the wheel cylinder in accordance with a slip signal generated at the associated wheel upon going into a relatively slipping condition of incipient skid. Each brake release valve has an inlet port connected to the master cylinder, an outlet port connected to the wheel cylinder, and a control port. In the preferred embodiment the valve has a first or "signal" piston movable in response to slip signal pressure applied to the control port and a second piston for creating a cavity for temporary accommodation of brake fluid from the wheel cylinder. When the pressure at the control port rises, signaling an incipient skid, movement of the signal piston first cuts off the inlet port to isolate the wheel cylinder from the rest of the regular braking system and then shifts the second piston to create a cavity for accommodating slight reverse flow of fluid from the wheel cylinder, thus relieving the brake pressure sufficiently to avoid a skid. The inlet-outlet ports are bridged by a check valve to insure immediate release of the wheel cylinder upon release of the brake pedal. In an alternate form of the invention utilizing an electrical slip signal, the signal piston is replaced by a solenoid plunger.

14 Claims, 8 Drawing Figures

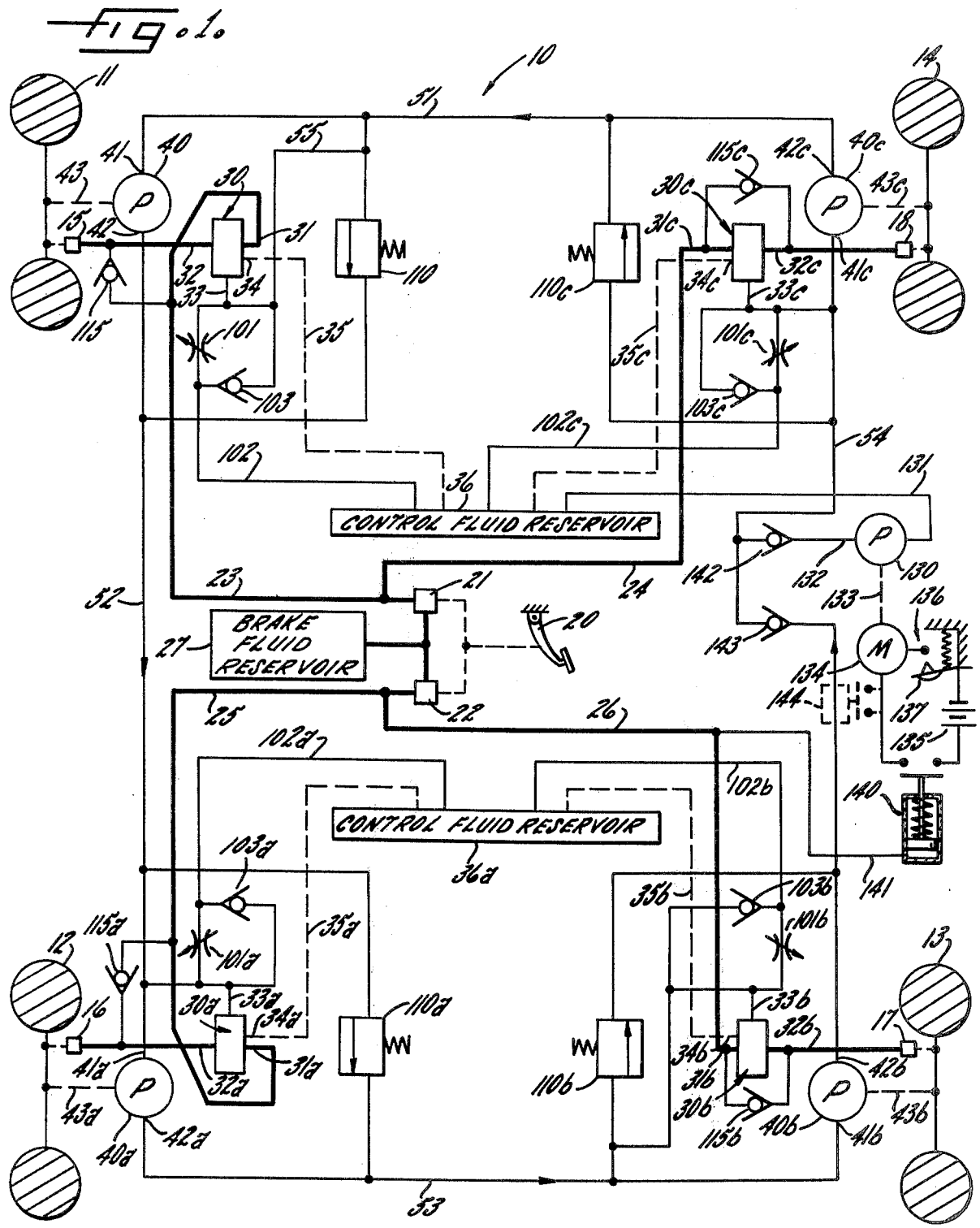

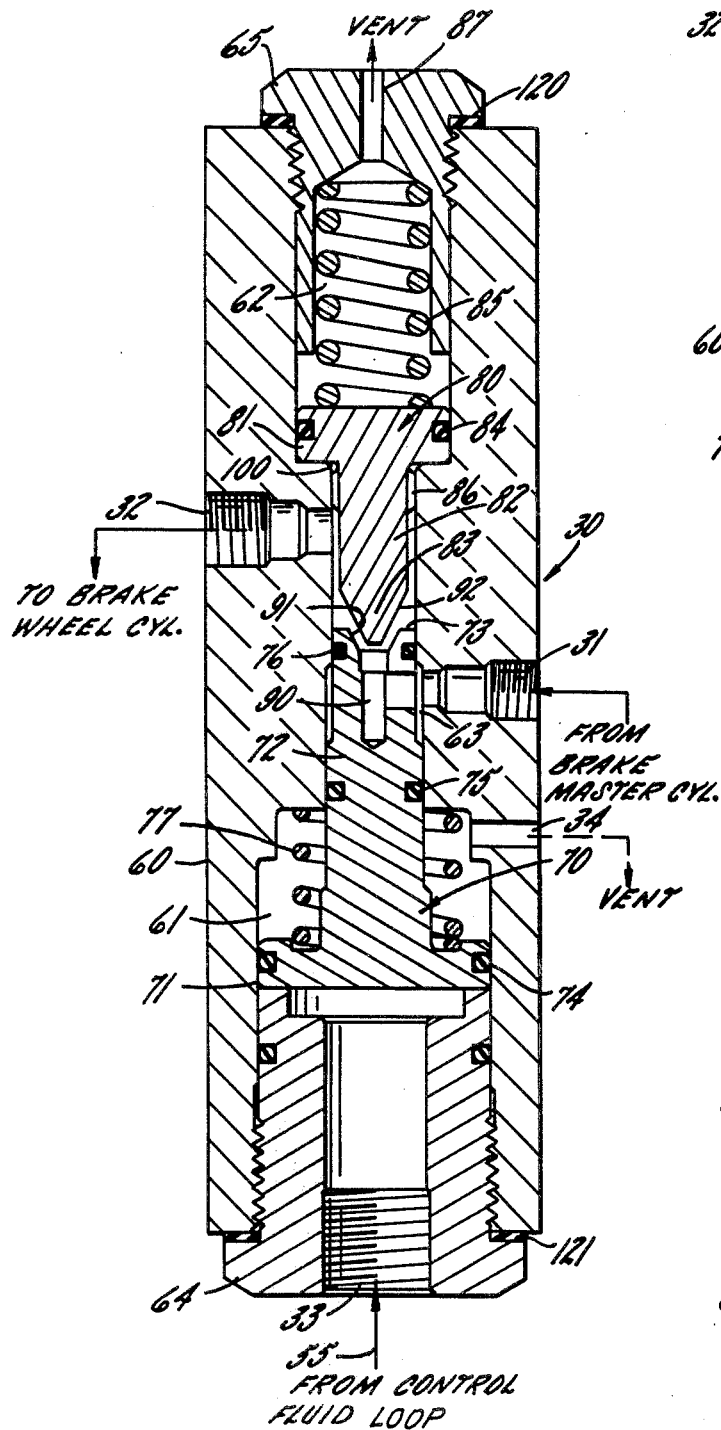
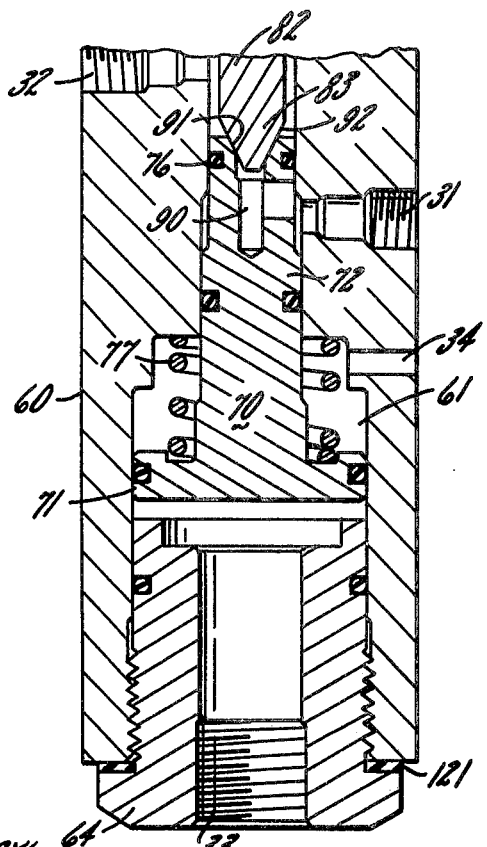
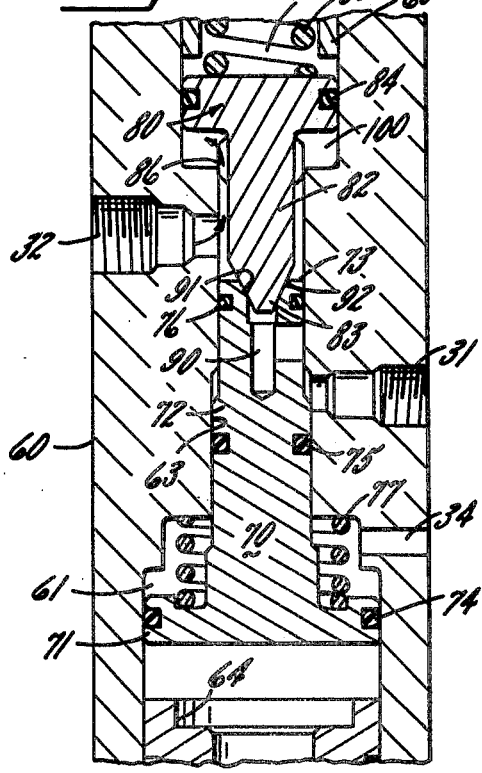

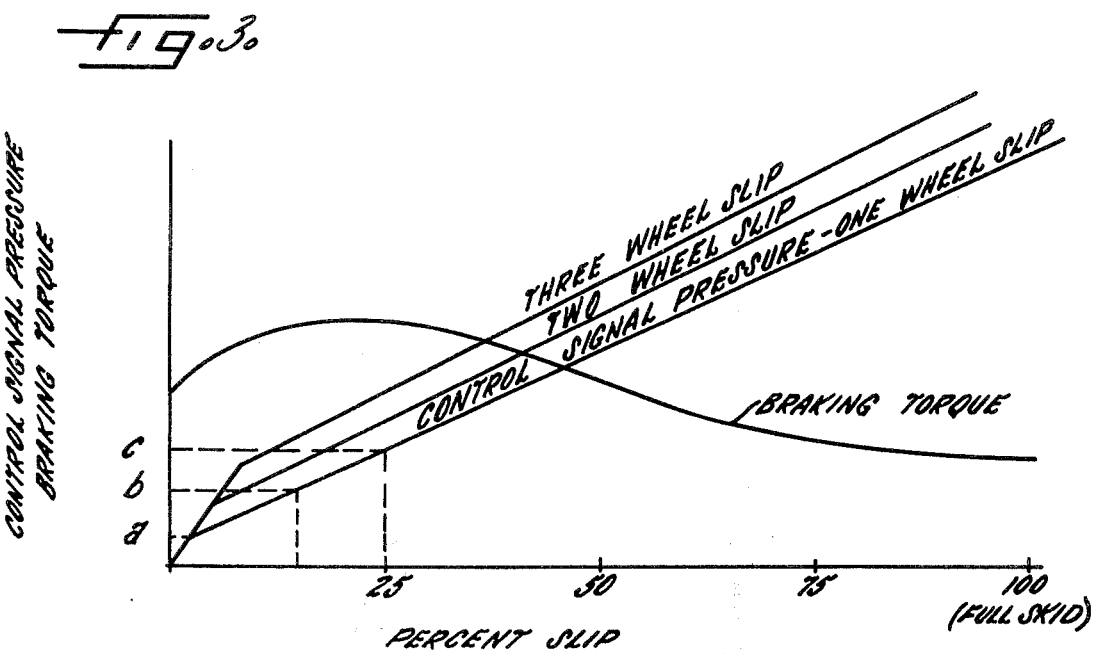
_fig.3._
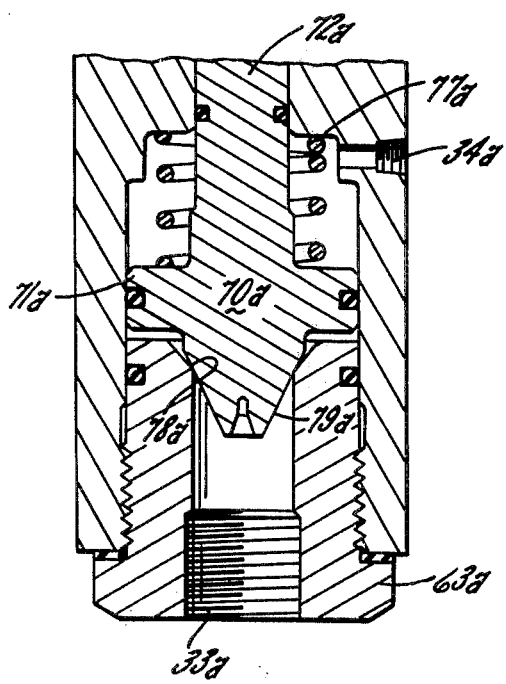
_fig.4._

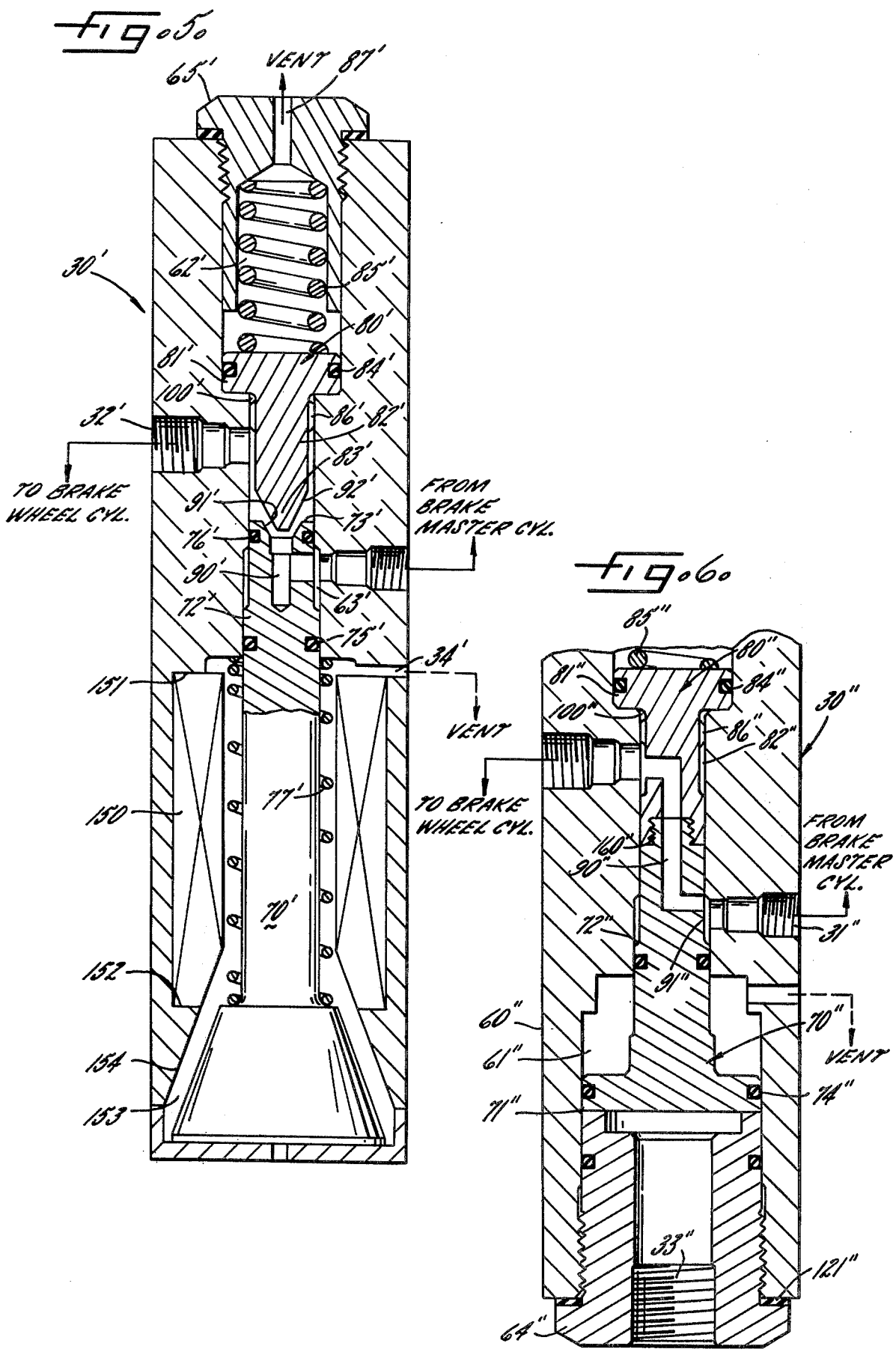

VALVE AND RESPONSIVE CIRCUIT FOR ANTI-SKID HYDRAULIC BRAKING SYSTEM

BACKGROUND OF THE INVENTION

The present invention relates generally to anti-skid systems for automotive vehicles. Means have been provided in the past for detecting the relative slowdown of a vehicle wheel which occurs in a skid to produce a skid signal and for utilizing such signal to relieve braking pressure at the particular wheel. Such anti-skid systems having predominantly utilized electronically generated signals. The means for generating and responding to such signals have tended to be complex and costly. Such systems have suffered from a general lack of reliability, and some of the systems have been susceptible to running out of fluid as a result of repeated cycling occurring within a sustained stroke of the brake pedal. Resort has been had to using air as the signalling medium, but air systems are equally unreliable and disadvantageous for other reasons.

SUMMARY OF THE INVENTION

It is, accordingly, an object of the present invention to provide an anti-skid system for a vehicle which is reliable, which is capable of sensitively responding to a slipping condition of incipient skid, and which prevents development of a full skid at any one of the vehicle wheels. It is a more specific object of the invention to provide hydraulic means for responding to a signal which varies in proportion to the degree of slip and which is capable of modulating the braking pressure individually at the affected wheel, at the option of the designer, to permit a slight slipping condition on the order of 10 to 15% at which braking effect is found to be maximized and at which steering control is fully maintained. In short the present system permits controlled slip of any desired degree without degeneration of the slip into a skid.

It is another object to provide a braking system which, as an alternative to controlled minor slip, may be safety operated in the hunting mode. Regardless of the mode of operation, the brake fluid which flows from the wheel cylinder to temporarily relieve the braking torque is fully conserved so that there is no risk of "running out of fluid" in a prolonged stroke of the foot pedal.

It is another object of the present invention to provide an anti-skid control for an hydraulic braking system which is applicable to all vehicles employing hydraulic brakes and which, although characterized by a high degree of safety and reliability, is nevertheless simple and inexpensive to manufacture and install and which is inherently durable, capable of operating over long periods of time stably and without any maintenance problems. Indeed it is an object to provide an anti-skid system in which a mechanical adjustment to set the optimum braking condition can be easily and quickly made and, once made, remains stably in adjusted condition without requiring continual readjustment.

It is another object of the present invention to provide an anti-skid system for vehicle brakes which produces precise results but which is nevertheless made up of components which are either readily available on the commercial market or which can be easily manufactured without resort to accurate tolerances. By way of example, the system employs positive displacement hydraulic pumps, but such pumps need not be accurately machined for close clearances and high efficiency but, on the contrary, the pumps are preferably of low efficiency and low volumetric rate, thereby achieving optimum operating characteristics at lowest possible cost.

In carrying out the invention, one of the pumps is coupled to each of the vehicle wheels. Lines are provided connecting the pumps in series loop circuit which is charged with control fluid, with the fluid circulating idly at low pressure in the loop as long as the associated wheels rotate at precisely the same speed. However, when a wheel slows down relatively to the other wheel, or wheels, to which it is connected, indicating a relatively slipping condition of incipient skid, the control fluid cannot be accepted at the pump inlet of the slipping wheel at the same rate that the fluid is being supplied by the pump at the non-slipping "upstream" wheel, resulting in back-up of control fluid and generation of back pressure which forms a slip signal.

For responding to the slip signal, a brake release valve is provided having a first piston, referred to as a "signal" piston and a second piston referred to as a brake fluid "accommodating" piston. The signal piston is biased into a normal position in which valve inlet and outlet ports are interconnected for normal operation of the brakes by the brake pedal. The signal piston upon initial movement by the control fluid, closes a valve seat to isolate the affected brake from the remainder of the regular braking system. The brake fluid accommodating piston is arranged in the path of movement of the signal piston so that continued movement of the signal piston displaces the accommodating piston, thereby creating a cavity in communication with the valve outlet port. Creation of the cavity permits brake fluid to flow reversely from the wheel cylinder thereby relieving the pressure at the wheel cylinder so that the slipping wheel is partially released by the brake reducing the slip and preventing the wheel from going into a full skid. Resumption of rotative speed reduces the signal pressure in the control fluid, tending to restore both pistons to their initial positions. The brake fluid which has been temporarily accommodated in the cavity is thus returned, without loss, to the regular braking system. Each pump is by-passed by a capillary or similar restriction to provide a control signal which varies more linearly with the rate of flow and hence with the degree of slip. The resulting lack of fluid elsewhere in the control loop is made up by flow from a reservoir through a check valve to prevent the condition of negative pressure referred to as "cavitation". Each pump is shunted by a by-pass relief valve to limit the pressure across each pump under extreme conditions. Auxiliary means are provided, and may be optionally used, to insure against loss of pressure in the rare circumstance of slippage at all of the associated wheels to equal degree.

DESCRIPTION OF THE DRAWINGS

FIG. 1 is a hydraulic diagram showing the present anti-skid braking system with the regular hydraulic lines being indicated by the heavy lines and the anti-skid control by the lighter lines;

FIG. 2 is a cross-sectional view of a brake release valve embodying the present invention;

FIg. 2a is a stop motion view showing isolation of the affected brake from the remainder of the braking system;

FIG. 2b is a stop motion view showing the relieving of braking pressure by controlled reverse-flow accommodation of braking fluid;

FIG. 3 is a characteristic curve showing the signal pressure and braking torque as a function of slip;

FIG. 4 shows a modified form of brake release valve including a differential poppet for modified braking characteristics;

FIG. 5 shows a brake release valve in which a solenoid is used; and

FIG. 6 is a fragmentary section of a valve having a unitary piston.

While the invention will be described in connection with certain preferred embodiments, it will be understood that I do not intend to be limited to the particular embodiments shown but I intend, on the contrary, to cover the various alternative and equivalent constructions included within the spirit and scope of the appended claims.

DETAILED DESCRIPTION OF THE PREFERRED EMBODIMENT

Referring now to FIG. 1, there is shown an anti-skid braking system 10 for a vehicle having four wheels 11, 12, 13 and 14. The wheels will be understood to have brakes, not shown, having individual actuators in the form of wheel cylinders 15, 16, 17 and 18. A "dual" braking system has been illustrated in which a single foot pedal 20 controls master cylinders 21, 22, either with or without power assist. The master cylinder 21 is connected to wheel cylinders 15, 18 via lines 23, 24, while the master cylinder 22 is connected to wheel cylinders 16, 17 via lines 25, 26. Fluid is supplied to the master cylinders from a brake fluid reservoir 27. As is well known, the purpose of the master cylinders 21, 22 is to pressurize the brake lines with hydraulic fluid substantially in proportion to the amount of force exerted upon the brake pedal 20. By applying sufficient pressure to the pedal it is readily possible to lock one or more of the wheels 11-14 into a full skidding condition which is disadvantageous and which may be highly dangerous, both because of the reduction in braking effect in a full skid and since steering control is completely lost.

In accordance with the present invention, special anti-skid brake release valves are interposed in the lines 23-26 leading to the respective wheels. A pressure signal resulting from partial slippage and indicating an incipient skidding condition at one of the wheels is applied to the associated brake release valve which immediately isolates the wheel cylinder from its pressure supply line, and hence from the remainder of the regular braking system, while bringing about a temporary reduction in the fluid pressure applied at the wheel cylinder to reduce the force applied to the brake so that the slippage does not degenerate into a full skidding condition.

Directing attention to the upper lefthand corner of the system shown in FIG. 1, a brake release valve 30 is provided having an inlet port, or connection, 31, an outlet connection 32, and a control connection 33, with the inlet and outlet connections being interposed in series with the regular brake line 23. There is, in addition, a vent 34 which, in one of the embodiments of the invention, is connected via a line 35 to the control fluid reservoir 36.

For the purpose of generating a pressure control signal for application to the control port 33 of the valve, a pump of the positive displacement type is provided at each of the wheels, for example, the pump 40 having an inlet connection 41 and an outlet connection 42. The pump is driven through a mechanical connection 43 from the associated vehicle wheel 11. While the pump is of the positive displacement type in which the volumetric rate is proportional to speed, the pump need not be lightly efficient, that is, the pump may be inexpensively constructed so as to tolerate a certain amount of leakage past the relative pumping surfaces and it may, in addition, be of low volumetric capacity delivering capacity delivering the fluid on the order of 0.04 to 0.10 cu. in. per revolution depending on the size of the vehicle.

The pumps 40 associated with all of the wheels are arranged in a series loop circuit, interconnected by lines 51, 52, 53, 54. The anti-skid devices associated with each of the vehicle wheels are, for practical purposes, identical, and consequently the same reference numerals have been employed to designate similar elements at wheels 12, 13 and 14 with addition of subscripts a, b, and c, respectively.

It will be apparent that with all of the wheels 11-14 turning normally, each of the pumps will produce, and require, fluid at the same volumetric rate so that fluid will circulate idly and at low pressure through the loop lines 51-54. This will be true regardless of whether the brake is not applied, as long as there is no slippage. However, in the event that there is slippage, or incipient skidding, at one of the wheels, for example, at the wheel 11, the pump 40 will turn at a slightly slower rate than the other pumps 40a, 40b, 40c in the loop. The result is that the "upstream" pump 40c will produce fluid at a rate greater than that which can be accepted at the inlet 41 of the pump 40, resulting in a buildup of pressure of the fluid at the pump inlet (line 51). It is such "back" pressure, constituting a control signal, which is applied via line 55, to the port 33 of brake release valve 30. The effect of this application of signal pressure will be apparent upon considering the construction of the brake release valve in FIG. 2.

It is to be noted that the valve includes a body 60 having cylindrical recesses 61, 62 formed in its ends jointed by a central bore 63. The recesses are enclosed by threaded end plugs 64, 65. Fitted in the cylindrical recess 61 is a "signal" piston 70 having a large diameter end portion 71 and a cylindrical plunger or shank 72 fitted in the central bore 63. The shank 72 has a tip 73. To prevent leakage of fluid around the signal piston "O" rings 74, 75, 76 are used. The piston is urged outwardly against the plug 64 to a normal, or reference, position by means of a return spring 77.

Mounted in the righthand end of the valve body is a second piston 80 which, by reason of function, may be referred to as the brake fluid "accommodating" piston. The piston has an enlarged head portion 81 and a shank portion 82 terminating at a tip 83. The second piston is sealed, with respect to the wall of the recess 62, by means of an "O" ring 84. The piston 80 is pressed into the illustrated seated, or normal, position by a strong return spring 85, the spring being sufficiently stiff as to be unyielding in the face of normal hydraulic braking pressures. For guiding the piston in the bore 65 while permitting free access to fluid to the head portion 81 of the piston, the plunger is provided with a plurality of peripherally spaced lands 86. The recess 62 is vented by a vent opening 87.

In accordance with the present invention, the two pistons are slightly spaced, end to end, from one another when in their normal positions and valve surfaces are provided on the adjacent ends of the pistons so that as the signal begins to move, the space between the two pistons is taken up and the pistons seat together to shut off the fluid connection at the inlet opening 31 for isolation purposes. Thus the tip 73 of the signal piston is centrally hollowed as indicated at 90, with the hollow communicating, via a sliding connection, with the inlet opening 31. The hollow is flared to define an annular valve seat 91 which cooperates with a conical surface 92 on the tip of the second piston.

Under normal braking conditions, it will be apparent that there is a free passage from inlet port 31 through the hollow 90 past the valve seating surfaces 91, 92 to the outlet port 32, and thence to the wheel cylinder. However, when slippage occurs in the wheel 11, causing the pump 40 to turn more slowly, the resulting back pressure in line 51 (and 55) causes the signal piston 70 to be unseated and to move to the right to bring the valve seat 91 against the conical surface 92 on the second piston. This seals off the inlet opening 31, isolating the wheel cylinder 15 from its supply line 23 and the rest of the regular hydraulic braking components. Continued movement of the signal piston 70 to the right causes the accommodating piston 80 to be displaced to the right as illustrated in FIG. 2b, thereby opening up, adjacent the head 81 of piston 80, a cavity 100. Since a high level of pressure exists at the wheel cylinder 15, brake fluid will flow, reversely, into the outlet port 32 and into the cavity 100, thereby relieving the pressure in the wheel cylinder 15 by an amount which is in accordance with the volume of cavity which has been created, the latter depending, in turn, upon the amount of movement the signal piston 70 has undergone. Because of the small amount of brake fluid consumed by the wheel cylinder 15 in going from its relaxed state to full braking condition, and because of the incompressible nature of the brake fluid, only a small cavity volume is required to bring about a substantial decrease in wheel cylinder pressure. However, in order to enable the force of the biasing or return spring 85 to be overcome with only moderate levels of control signal pressure the signal piston 70 preferably has a diameter which greatly exceeds that of the piston 80.

It is thus seen that the condition of slippage at the wheel 11 is self-correcting. Slippage results in a slowing down of the pump 40 which results in an increase in pressure control signal applied to the control port 33 which results in movement of the signal piston 70 from its reference position. Such movement seals off the inlet by closure of seats 91, 92 and results in displacement of piston 80 and creation of cavity 100 to relieve the brake pressure which initiated the slippage. As the slippage is reduced, the signal pressure at the control port also is reduced, permitting the cavity 100 to contract slightly under the urging of the biasing spring 85, thereby causing fluid from the cavity to flow back to the wheel cylinder, with a condition of equilibrium being quickly established at a condition of slight slip in which braking is maximized and with all wheels turning for full steering control. Within the same braking cycle slip may increase and decrease a number of times due to local variations in the conditions of traction resulting in repeated cycling of fluid back and forth between the wheel cylinder and the cavity as the system strives to establish equilibrium. But regardless of the number of interchanges which may occur within a single braking action all of the braking fluid is captively retained and continues to be fully available. This is to be contrasted with anit-skid systems in which fluid is released from the wheel cylinder by controlled braking back to the fluid reservoir and in which the wheel cylinder, as a result of repeated cycling into and out of a condition of slippage, may "run out of fluid" resulting in loss of braking effect.

The "excess" control fluid received by pump 40, and which cannot be accommodated by the pump due to slippage of wheel 11, is permitted to leak into the control fluid reservoir 36. To dispose of the excess fluid and to produce a more linear variation of back pressure over the useful range, a restricted passage 101 is provided at the input, discharging via line 102 into a region of reference pressure level, specifically into the control fluid reservoir 36. The restricted passage is preferably in the form of a capillary tube of predetermined length and width diameter and with an adjustable orifice for optimization. As a result, the pressure control signal which is applied to the control port 33 varies more nearly in accordance with the difference in rotative speed between the pump 40 and the "upstream" pump 40c. In short, the control signal pressure is more nearly proportional to the degree of the slip.

At the same time that there is excess fluid in the line 51, by reason of slowdown of the pump 40, there is a corresponding starvation in the "downstream" line 52. In order to prevent cavitation and the development of negative pressure in the line 52, each of the restrictions 101 is bypassed by a check valve 103 which is faced in a direction to supply fluid from the reservoir 36 and which is intentionally very lightly loaded so that the replenishment of fluid takes place promptly even with a low differential pressure. Thus the shortage of fluid in line 52 will be immediately made up by replenishing flow through the check valve 130a associated with the second wheel 12. To the extent that lack of fluid in the line 52 tends to produce temporary lack of fluid in the lines 53, 54 downstream therefrom, replenishment will also promptly occur through check valves 103b and 103c.

For shunting fluid directly from the upstream line 51 to the downstream line 52 when the pressure differential across the pump reaches a predetermined level, a bypass relief valve 110 is connected around the pump 40. The relief valve is commercially available type, and performs a number of significant functions. It will be understood, in the first place, that the capillary 101, while providing a desired signal characteristic over the critical low range of slip, has only a limited fluid handling capacity, and indeed the capacity is intentionally limited to provide the desired range of control signal. The first function, therefore, affected by the bypass relief valve 110 is to take care of any substantial quantity of excess control fluid in line 51, fluid which cannot be accommodated by the input of the "slipping" pump 40. Not only does the relief valve serve to divert the fluid from the capillary, but it also performs the important function of limiting the pressure on the upstream side of the capillary. Further, the relief valve 110 assists in maintaining the downstream line 52 under pressure so that slippage at the wheel 11 will not interfere with control of downstream wheel 12. It should be noted that the replenishing function of the check valve 103a associated with the wheel 12, while capable of replenishing line 52, is ineffective to pressurize such line and positive pressure in line 52 is necessary for the anti-skid function. The bypass relief valve 110, in effect, connects the output of pump 40c directly to the input of pump 40a so that the system associated with the latter may operate, notwithstanding correction of slippage at the intervening pump 40. Similarly, if the wheel 12 should suffer a high degree of slip at the same time as wheel 11, the relief valve 110a acts to bypass the pump 40a to maintain the line 53 pressurized with control fluid, the fluid in effect, being fed directly from the outlet of pump 40c to the inlet of pump 40b. In short, while the control systems associated with the respective wheels are connected in the series loop circuit, the operation of any one of them does not penalize the operation of any other.

Under normal braking conditions when there is no slippage, the wheel cylinder 15 is pressurized by fluid that flows through the brake release valve 30 from brake line 23. Adequate pressure is available in the line 53 so that passage of the fluid through the release valve 30 from inlet to outlet offers substantially no impediment. However, for the purpose of enabling more immediate return of fluid reversely through the line 23 when the brake pedal is suddenly released, the ports 31, 32 of the brake release valve are shunted by a fluid-returning check valve 115 which provides a bypass connection directly from the wheel cylinder 15 and cavity 100 back into the brake line 23. The presence of the check valve 115 insures that release of the brake line occurs promptly upon release of the foot pedal, even before the signal piston may have opened the isolating valve seats 91, 92. The check valve 115 is only lightly biased so that it also responds to slight letting up of pedal pressure, returning fluid to the line from the wheel cylinder and the cavity on a partial basis when the brake pedal is only partially released.

A typical characteristic curve achievable using the present system is illustrated in FIG. 3 in which the percentage of slip is plotted as the abscissa and the pressure of the control signal in line 51 (for example) as the ordinate. The pressure in the line in the absence of slip, and with control fluid circulating freely, is substantially zero. As the slip begins, accompanied by slowdown of the pump 40, back pressure builds up in the line 51 and 55, generating a pressure control signal. When the signal reaches a level $a$, corresponding to a slip of about 5%, the relief valve opens. The relief valve is preferably of the type in which the back pressure is permitted to build up progressively with the rate of flow, so that pressure continues to build up until the point $b$ is reached where the pressure is sufficient to move the signal piston 70 to engage valve surfaces 91, 92 to shut off the inlet port 31. Upon further increase in the slip, with increase in the pressure control signal to point $c$, the cavity 100 is opened sufficiently to relieve the braking torque exerted by the wheel cylinder 15, allowing the wheel to rotate more freely to reduce the slip, so that corrective action sets in before the slip has exceeded a reasonable level which may, in a practical case, be on the order of 25%. With slight relief of the braking pressure, the degree of slip will then decrease to establish equilibrium at a slightly lower slip, say between $b$ and $c$, at a slippage level which may, for example, be on the order of 15–20% until braking pressure is released by the driver. The protective action sets in quickly enough and positively enough so that there is no possibility of the slippage degenerating into a full skid.

Since the control signal pressure, particularly over the initial portion of the range, which corresponds to a slip of 0–25%, is substantially linear, the effect of the system, once slip sets in, is to modulate the pressure of the captive brake fluid within the region of maximum braking torque. Where more than one wheel slips, that is, where the wheels 12, 13 downstream from the wheel 11 also are in a slipping state, the effect is to increase the level of the control signal pressure applied to release valve 30, as shown in FIG. 3.

The return spring 85 which is associated with the accommodating piston 80 is preferably stiff enough so that the piston 80 does not yield in the face of a normal range of fluid pressure originating in the master cylinder 21. The maximum diameter of the signal piston 70 is preferably large enough so that normal range of control signal pressure, when added to the pressure of the captive fluid at the outlet port 32, will suffice to move both of the pistons together, against the forces of their return springs, a sufficient distance to create a meaningful cavity. The amount of cavity volume resulting from per unit displacment of the accommodating piston 80 may be controlled by tailoring of the maximum diameter of the piston 80. The force exerted by the return spring 85 may be controlled by screwing in, or out, the threaded plug 64, and the adjustment, once set, may be retained by using a gasket 120 of appropriate thickness under the head of the plug. Similarly, the normal position of the signal piston 70 may be determined by use of a gasket 121 under the head of the plug 53, the object being to have sufficient spacing between the valve surfaces 91, 92 to provide relatively unobstructed flow to the wheel cylinder for normal braking while, nevertheless, spacing the valve seat surfaces 91, 92 sufficiently closely so that, once slipping starts, the wheel cylinder of the affected wheel is promptly isolated from the rest of the regular braking system which remains under the control of the foot pedal 20.

Using the present anti-skid system, the maximum possible degree of slip is at a sufficiently low level, on the order of 25%, so as to insure effective steering at the front wheels of the vehicle as well as insuring a high degree of braking effect with equilibrium being preferably established in the range of 10–20%.

The same type of action, as just described, occurs even though more than one wheel tends to slip. Since there will be local differences in the braking surfaces, condition of the tires, and the like, slippage will not normally occur at each wheel at the same instant. However, it is conceivable, even though highly unlikely, that all four wheels might slip to precisely even degree and go into a full skid simultaneously, accompanied by stoppage of all of the pumps, so that there would be no pressure anywhere in the loop to initiate the anti-skid function. Thus, I provide an auxiliary hydraulic pump 130 preferably of the positive displacement type having an input connection 131 to the fluid reservoir 36 and an output connection 132 to the loop, specifically to the loop line 54. The pump is connected by a shaft 133 to a motor 134 having a source of current 135, normally the vehicle battery, in series with a deceleration switch 136. The switch may be any suitable switch capable of making contact in response to deceleration and in the simplest form may include a blade biased to open position carrying a weight 137. A pressure responsive switch 140 is also interposed in the circuit connected to brake line 26 by a line 141 so that the auxiliary pump is only energized when the vehicle is being braked under conditions of high deceleration.

Thus, whenever the vehicle decelerates at a rate exceeding a set amount, switches 136, 140 close, starting the motor 134, to drive the pump to insure that fluid exists in the loop at sufficient pressure to initiate the anti-skid function. Since the auxiliary pump is connected to the line 54, if the wheel 14 tends to become locked, along with all the other wheels, sufficient pressure will exist at the control port 33c of the brake release valve 30c to form a cavity to drop the pressure of the wheel cylinder 18 so that the wheel 14 begins to rotate. Rotation of the wheel 14 will develop sufficient pressure in line 51 to operate brake release valve 30 to free up wheel 11 which will, in turn, pressurize line 52 so that rapidly, in domino fashion, all of the wheels of the vehicle will be rotatable but with full braking effect. A first check valve 142 is preferably interposed at the outlet of pump 130 to prevent the pump from being driven as a motor under idle conditions, while a second check valve 143 prevents reverse flow of fluid in the line 54. It is important that the capacity of the auxiliary pump be limited to a low flow rate, for example, a flow rate corresponding to a vehicle speed of about ten miles per hour. If it is desired to sense directly lack of fluid flow in line 54, a "zero flow" detector switch 144, of the type making contact at zero or low rates of flow, may be additionally interposed in the motor control circuit. While injection of auxiliary fluid at one point of the loop is sufficient, the outlet connection 132 of the auxiliary pump may, if desired, be connected to all four of the lines 51–54 via similar check valves 142, 143.

In the construction of brake release valve described in FIG. 2, movement of the signal piston 70 occurs gradually and progressively after the signal pressure reaches a threshold sufficient to oppose the initial force of the return spring 77. The response can be made more rapid and positive, with snap action after achieving a threshold condition, by employing a differential poppet in lieu of the signal piston as illustrated in FIG. 4. Here the poppet, indicated at 70a, has a large diameter portion 71a and a relatively small diameter valve seat 78a cooperating with a conical tip 79a. Thus movement of the poppet does not take place until sufficient control pressure exists, which, when applied to the effective area enclosed by the seat 78a, is capable of overcoming the initial force of the return spring 77a. As soon as the valve surfaces 78a, 79a crack open, control fluid is admitted to the entire frontal area of the signal piston 70a resulting in an abrupt increase in pressure applied to the signal piston causing the piston to snap upwardly, closing valve surfaces 91, 92 and immediately shifting the accommodating piston 80 upwardly to form a cavity. It will be apparent that the snap action effect may be varied by utilizing different plugs 63a having different diameters of valve seat 48a. When a poppet type piston is used the space in back of the piston 70, and which is occupied by the biasing spring 77 is preferably kept filled with control fluid via a line 35 connected to vent 34 and leading to the reservoir 36.

While the invention has been described (FIG. 3) in terms of modulation of brake pressure by varying the volume of cavity 100 in accordance with the pressure of the control signal to establish a temporary equilibrium condition of slight slippage, it is one of the features of the invention that a system is capable of operating safely in a hunting mode without depletion of brake fluid in the wheel cylinder. That is to say, the accommodating piston 80 may, in response to a sustained braking cycle at the foot pedal, reciprocate back and forth a number of times between a slip and no-slip condition while conserving the trapped brake fluid and with the same brake fluid undergoing numerous slight reversals of flow in the line leading from the outlet port 32 to the brake cylinder 15. This conservation of brake fluid is to be contrasted with the systems in which excessive pressure at the wheel cylinder is relieved by permitting slight leakage to the brake fluid reservoir.

Moreover, while I prefer to employ slidable, spring biased pistons 70, 80, it will be understood by one skilled in the art that, if desired, the spring biased diaphragms may be substituted therefor without departing from the invention and the term "piston" should be interpreted accordingly.

The term "master cylinder" as used herein is also intended to be a general term to cover any actuator capable of exerting pressure in the normal hydraulic brake lines 23–26, and the term "pedal" shall be understood to mean any control device for controlling such an actuator.

It is one of the features of the present system that two completely isolated bodies of fluid are employed for braking and control respectively. While both fluids enter the brake release valve 30 (FIG. 2), there is no possibility of mixing even in the event of faulty "O" ring or seal. Thus, referring to FIG. 2, control fluid exists at the lower side of the piston 70. Even if such fluid, which is under pressure, should leak past "O" ring 74, it will drain harmlessly through the vent. Similarly, if any of the brake fluid, also under pressure, should leak past the "O" ring 75, it, too, will drain harmlessly without tending to mix with the control fluid. In short, two separate liquids are used by they are not at the respective sides of the same "O" ring. While it is true that in the embodiment of FIG. 4 different fluids exist on the opposite sides of an "O" ring, leakage of control fluid in that embodiment is precluded by positive seating at the poppet valve surfaces under normal conditions so that leakage, in any event, tends to be minimized.

While the invention has been described in connection with a system (FIG. 1) in which pumps at all of the wheels are connected in the same loop circuit 51–54, it will be understood that the invention is not limited thereto and, if desired, the pumps at the diagonal positions may be respectively connected in two different loop circuits.

It is one of the features of the present invention that the control characteristics may be varied over rather wide limits at the choice of the designer. Thus it will be understood that the particular characteristic of control signal pressure which is set forth in FIG. 3 results where the relief valves set to perform a relief function at relatively low pressure and where such relief valves have a rising pressure characteristic thereafter upon increased flow. The invention also contemplates setting the relief valves at a higher pressure so that they perform a primarily protective function which will, of course, change the shape of the characteristic without, however, sacrificing the benefits of the invention.

It is one of the features of the invention, as disclosed and claimed, but braking pressure at a slipping wheel is released thereby to prevent the wheel from going into a full skid. It will be understood that this applies to normal driving speeds where sufficient fluid is discharged from the upstream wheel pump to develop the signal level necessary to preclude skidding. It will be understood, however, that since the wheel pumps produce fluid at a low rate, and are intentionally somewhat inefficient, the present system does not necessarily provide skid protection at extremely low speeds, for example, speeds of 5 to 10 miles per hour or less, but this does not detract from the utility of the invention since a vehicle traveling at such a low speed has relatively low kinetic energy so that it is brought to a halt promptly, after skidding only a few feet if, indeed, a full skidding condition should develop.

While it is preferred to utilize the release valve 30 of FIG. 2 with a loop type control system as set forth in FIG. 1, the present invention contemplates the replacement of the signal piston 70 by a solenoid for electrical actuation. Such alternate form of the invention is illustrated in FIG. 5 in which elements which are common to the preferred embodiment are designated by the same reference numerals with the addition of primes. Thus the piston of the earlier embodiment is replaced by a solenoid plunger 70' having a return spring 77'. The plunger operates within a magnetic coil having terminals 151, 152. The plunger 70' has an enlarged end portion with a conical pole face 153 which cooperates with a mating pole face 154 on the stationary magnetic structure.

In operation, signal current at an increasing level applied to terminals 151, 152 causes inward movement of the plunger 70' to close off the valve surfaces 91', 92' to isolate the connected wheel cylinder from the master cylinder. Further increase in signal current causes progressive endwise movement of the second or "accommodating", piston 80' to open up a cavity 100', thereby to relieve the brake pressure at the slipping wheel as previously discussed. The particular magnetic structure is advantageous since it was a progressively rising force characteristic so that moderate signal levels suffice to overcome the restoring force of the spring 85' associated with the second piston.

Where the modification of FIG. 5 is employed, the signal input terminals 151, 152 may be energized from an electrical control circuit of the type set forth, for example, in prior Packer et al. U.S. Pat. No. 3,682,515 which is issued Aug. 8, 1972, the coil 150 in the present device corresponding to the coil S1 in FIG. 1 of the Packer patent. Cross reference is made to the patent for an understanding of the details of the operation.

Although it is preferred to use two separate pistons 70, 80, which are actuated sequentially, with the first being used for isolating the wheel cylinder and the second for relieving its pressure, the invention is not necessarily limited to use of two separately movable pistons and, if desired, the pistons 70, 80 may be unitary as illustrated in FIG. 6. In this figure corresponding reference numerals are employed to indicate similar parts, with the addition of a double prime. In this figure the two pistons, indicated at 70", 80" are united, at their center, by a threaded connection 160. Instead of utilizing the relative piston movement to close off the inlet port 31" a continuous passageway 90" is provided leading between the ports, the passageway having a land surface 90" at its inlet end which moves out of register with the inlet port during the initial portion of piston movement to accomplish the isolation function.

Thus in a typical cycle, application of fluid pressure to the control port 33", moving the composite piston 70", 80" upwardly, cuts off communication to the inlet port 31" during the initial portion of its movement. With continued movement of the piston the cavity 100" is progressively opened to permit slight reverse flow of fluid from the wheel cylinder thus relieving the pressure at the wheel cylinder and permitting the wheel to resume rotation. Upon return of the upper portion 80 of the piston, under the urging of the spring 85", a small amount of fluid will be temporarily trapped in the cavity 100", but piston clearances are preferably such that the residual fluid will be promptly squeezed out placing the device in readiness for an ensuing cycle.

The present anti-skid system has been found to have a number of important features and advantages fully supporting the objects set forth above. The system is extremely simple, reliable and inexpensive, having numerous advantages over the more complex electronic schemes now in current usage. The hydraulic components, being well lubricated, and sealed to exclude foreign matter, are long wearing, are not subject to catastrophic failure, and do not change in characteristic as a result of aging as do the components in analogous electronic circuitry. Thus, once the present system is installed and initially adjusted, it may be expected to retain the adjusted characteristics indefinitely to provide continuing safety over the life of the vehicle. Since fluid which is released from the wheel cylinder by the valve 30 is not leaked away but is captively recycled in the system, there is no possibility that a wheel cylinder, as a result of repeated cycling during a single prolonged application of the brake, will ever "run out of fluid". While the system is particularly well suited for use in large off-highway vehicles in which the wheels are driven by individual electric driving motors, providing convenient driving connection to the respective wheel pumps, its use is not limited thereto and the system is applicable to vehicles of all types.

I claim:

1. In an hydraulic braking system for a vehicle having wheel brakes employing respective wheel cylinders, means including a master cylinder and a brake pedal with respective brake lines for applying brake fluid to the wheel cylinders in proportion to the pressure exerted on the pedal for braking the vehicle to a stop, means coupled to each wheel for generating a control signal in response to a relatively slipping condition of incipient skid and which varies in accordance with the degree of slip, a brake release valve having an inlet port connected to the brake line and an outlet port connected to the wheel cylinder, the brake release valve having a plunger biased into a normal position and having signal responsive means for progressively moving the same against the force of bias upon increase in signal level, the inlet port being in direct communication with the outlet port for normal braking when the plunger is in its normal position, the plunger having a valve seat which is closed upon initial movement of the plunger occurring in response to the control signal for closing off the inlet port thereby to isolate the associated brake from the master cylinder, the brake release valve having a brake fluid accommodating piston biased into a normal contracted position and displaceable therefrom to create a cavity which is coupled to the outlet port, the brake fluid accommodating piston being connected to the signal piston by a lost motion connection so that upon further increase in control signal level the cavity is progressively enlarged permitting flow of brake fluid from the wheel cylinder into the cavity for temporary accommodation therein to relieve the pressure in the wheel cylinder thereby to prevent the wheel from going into a full skidding condition and to reduce such degree of slip, a fluid returning check valve bridging the inlet and outlet ports so that when the brake pedal is released, pressurized fluid from the wheel cylinder and cavity is immediately free to return to the brake line accompanied by restoration of the cavity to its normal contracted position.

2. The combination as claimed in claim 1 in which the brake fluid accommodating piston has a biasing spring which is sufficiently strong as to maintain such piston seated in its normal position in the base of the pressure of the brake fluid flowing from the inlet port to the outlet port in absence of slippage under regular braking conditions.

3. In an hydraulic braking braking system for a vehicle having wheel brakes employing respective wheel cylinders, means including pressure lines and a pedal-controlled source of pressurized brake fluid for applying fluid to the wheel cylinders in proportion to the pressure exerted on the pedal for braking the vehicle to a stop, means coupled to each wheel for generating a control signal in response to a relatively slipping condition of incipient skid and which varies in accordance with the degree of slip, brake release valve means interposed in the associated brake line and having a piston responsive to the control signal for isolating the release valve means and associated wheel cylinder from the master cylinder during the initial portion of piston movement, the piston defining a cavity of variable size communicating with the wheel cylinder for sequentially relieving the pressure of the brake fluid applied to the wheel cylinder, the piston having a biasing spring for normally minimizing the size of the cavity but for permitting the cavity to vary in size on a continuous modulated basis in accordance with the control signal thereby to prevent the wheel from going into a full skidding condition, and check valves respectively connected from the wheel cylinders to the source bypassing the brake release valve means and faced for return of fluid to the source for insuring immediate release of pressure at the wheel cylinders upon release of pressure at the source notwithstanding the isolating effect of the brake release valve means.

4. In a hydraulic braking system for a vehicle having wheel brakes employing respective wheel cylinders, means including a master cylinder and brake pedal with respective brake lines for applying brake fluid to the wheel cylinders in proportion to the pressure exerted on the pedal for braking the vehicle to a stop, means coupled to each wheel for generating a control signal in the form of pressure in a control fluid in response to a relatively slipping condition of incipient skid and which varies in accordance with the degree of slip, brake release valve means including a signal piston having a biasing spring and which is movable against the spring force in accordance with the pressure of the control fluid, and means responsive to movement of the piston for sequentially (a) isolating the release valve means and associated wheel cylinder from the master cylinder and (b) progressively releasing some of the brake fluid from the wheel cylinder in accordance with an increase in control signal to relieve the pressure of the brake fluid applied to the wheel cylinder thereby to prevent the wheel from going into full skidding condition, and means for adjusting the force exerted by the biasing spring thereby to adjust the degree of brake releasing action at the associated wheel.

5. In a hydraulic braking system for a vehicle having wheel brakes employing respective wheel cylinders, means including a master cylinder and brake pedal with respective brake lines for applying brake fluid to the wheel cylinders in proportion to the pressure exerted on the pedal for braking the vehicle to a stop, means coupled to each wheel for generating a control signal in response to a relatively slipping condition of incipient skid by reason of excess control fluid fed thereto, means for creating a fluid-receiving cavity in communication with each wheel cylinder, and brake release valve means including a pair of pistons having individual biasing springs responsive to the control signal for respectively and sequentially (a) isolating the associated wheel cylinder and its cavity from the master cylinder and (b) enlarging the cavity progressively against the force of bias so as to relieve the pressure of the brake fluid applied to the wheel cylinder thereby to prevent the wheel from going into a full skidding condition and to reduce the degree of slip, the biasing springs being separately adjustable so as to separately predetermine the point of isolation and the degree of brake releasing action.

6. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, means coupled to each wheel for generating a control signal in the form of pressure in a control fluid in response to a relatively slipping condition in incipient skid and which varies in accordance with the degree of slip, a brake release valve associated with each wheel cylinder having (a) an inlet port connected to the master cylinder, (b) an outlet port connected to the wheel cylinder, (c) a control port communicating with the pressurized control fluid, (d) excess brake fluid accommodating means, and (e) a signal piston movable in response to the signal pressure at the control port, the signal piston having a normal low pressure position in which the inlet port is connected to the outlet port for normal operation of the brakes by the pedal, the signal piston having a valve seat which is closed upon initial movement of the piston in response to pressure at the control port for closing off the inlet port to isolate the associated wheel cylinder from the master cylinder, the signal piston being controllingly coupled to the excess brake fluid accommodating means so that upon build-up of pressure at the control port brake fluid is permitted to flow reversely from the wheel cylinder to the accommodating means to relieve the pressure in the wheel cylinder thereby to prevent the wheel from going into a full skidding condition.

7. In an hydraulic braking system for a vehicle having wheel brakes employing respective wheel cylinders, means including a master cylinder and a brake pedal for applying brake fluid to the wheel cylinders in proportion to the pressure exerted on the pedal for braking the vehicle to a stop, means applied to each wheel for generating a control signal in the form of pressure in a control fluid in response to a relatively slipping condition of incipient skid and which varies in accordance with the degree of slip, a brake release valve associated with each wheel cylinder having (a) an inlet port connected to the master cylinder, (b) an outlet port connected to the wheel cylinder, and (c) a control port communicating with the pressurized control fluid, the brake release valve having a signal piston biased into a normal contracted position and progressively movable therefrom upon increase in signal pressure at the control port, the inlet port being connected to the outlet port when the signal piston is in normal position, the signal piston having a valve seat which is closed upon initial movement of such piston occurring in response to pressure at the control port for closing off the inlet port thereby to isolate the associated brake from the master cylinder, the brake release valve having a brake fluid accommodating piston biased into a normal position and displaceable therefrom to create a cavity which is coupled to the outlet port, the brake fluid accommodating piston being connected to the signal piston by a last motion connection so that upon increasing signal pressure at the control port the cavity is progressively enlarged permitting flow of brake fluid reversely from the wheel cylinder into the cavity to relieve the pressure in the wheel cylinder thereby to prevent the wheel from going into a full skidding condition.

8. The combination as claimed in claim 7 in which the brake fluid accommodating piston has a biasing spring which is sufficiently strong as to maintain such piston seated in its normal position in the face of the pressure of the brake fluid flowing from the inlet port to the outlet port under regular braking conditions.

9. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, means coupled to each wheel for generating a control signal in the form of pressure in a control fluid in response to a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port communicating with the pressurized control fluid, the release valve having a signal piston having a spring for biasing the same into a normal position and progressively movable therefrom in response to signal pressure at the control port, the inlet port being connected to the outlet port when the signal piston is in normal position for normal operation of the brakes by the pedal, the signal piston having a valve seat which is closed upon initial movement of the piston occurring in response to signal pressure at the control port for closing off the inlet port to isolate the associated brake from the master cylinder, the release valve having a brake fluid accommodating piston having a spring for biasing the same into a normal contracted, seated position and displaceable therefrom to create a cavity communicating with the outlet port, the brake fluid accommodating piston being located in the path of movement of the signal piston so that upon continued movement of the latter as signal pressure progressively increases the cavity is progressively enlarged permitting reverse flow of brake fluid from the wheel cylinder preventing the wheel from going into a full skidding condition, the biasing spring being sufficiently strong so as to keep the accommodating piston seated during normal braking, the diameter of the signal piston being substantially greater than the diameter of the accommodating piston to permit creation of the cavity at moderate levels of signal pressure.

10. The combination as claimed in claim 9 in which the two pistons are normally slightly spaced end to end to provide a path between the inlet port and the outlet port and in which the initial movement of the signal piston brings a valve seat on the latter into sealing engagement with the end of the brake fluid accommodating piston for closing off the inlet port.

11. The combination as claimed in claim 9 in which the signal piston is in the form of a poppet having an annular seat communicating with the control port and against which the poppet is normally seated, the poppet being so formed that upon leaving the seat additional poppet area is exposed to the fluid at the control port for accelerated movement of the poppet in response to signal pressure.

12. In an hydraulic braking system for a vehicle having wheel brakes employing respective wheel cylinders, means including a master cylinder and brake pedal with a brake line for applying brake fluid to each of the wheel cylinders in proportion to the pressure exerted on the pedal for braking the wheels to a stop, means associated with each wheel for generating a slip signal upon incipient skidding in accordance with the degree of slip, a brake release valve associated with each wheel cylinder having a housing defining (a) an inlet port connected to the master cylinder and (b) an outlet port connected to the wheel cylinder, the brake release valve having a signal plunger biased to a normal position in one end of the housing, means for moving the signal plunger from its normal position in response to the slip signal, the inlet port being connected to the outlet port when the signal piston is in its normal position for normal operation of the brakes by the pedal, the signal plunger having a valve seat which is closed upon initial movement of the plunger for closing off the inlet port thereby to isolate the associated brake from the master cylinder, the brake release valve having a brake fluid accommodating piston in the opposite end of the housing biased into a normal position and displaceable therefrom to create a cavity communicating with the outlet port, the brake fluid accommodating piston being located in the path of movement of the signal plunger and coaxial therewith so that, upon movement of the signal plunger with an increase in slip signal, the cavity is progressively enlarged permitting flow of braking fluid reversely from the wheel cylinder into the cavity relieving the pressure in the wheel cylinder to prevent the wheel from going into a full skidding condition and with the resulting reduction of slip reducing the slip signal for return of the plunger and piston to their normal positions, the brake fluid in the cavity being thereby restored to the brake line.

13. In an hydraulic braking system for a vehicle having wheel brakes employing respective wheel cylinders, means including a master cylinder and brake pedal for applying brake fluid to the wheel cylinders in proportion to the pressure exerted on the pedal for braking the wheel to a stop, means including a source of control fluid associated with each wheel for producing signal pressure upon incipient skidding in accordance with the degree of slip, a brake release valve associated with each wheel cylinder having a housing defining (a) an inlet port connected to the master cylinder, (b) an outlet port connected to the wheel cylinder, and (c) a control port connected to the source of control fluid of composition different from the brake fluid, the brake release valve having a signal piston biased to a normal position and in communication with the control port at its outer end for movement in accordance with the pressure of the control fluid, the inlet port being connected to the outlet port when the signal piston is in its normal position for normal operation of the brakes by the pedal, the signal piston having a valve seat at its inner end which is closed upon initial movement of the piston for closing off the inlet port thereby to isolate the associated brake from the master cylinder, the brake release valve having a brake fluid accommodating piston biased into a normal position and displaceable therefrom to create a cavity communicating with the outlet port, the brake fluid accommodating piston being located in the path of movement of the signal piston so that, upon movement of the signal piston with an increase in slip signal, the cavity is progressively enlarged permitting flow of braking fluid reversely from the wheel cylinder into the cavity thereby relieving the pressure in the wheel cylinder to prevent the wheel from going into a full skidding condition and with the resulting resumption of rotation reducing the slip signal for return of the pistons to their normal positions, the signal piston being sealed at its opposite ends with respect to the housing to prevent leakage of either fluid axially inwardly of the signal piston, the housing defining a vent at the center of the signal piston for disposing of any fluid which might leak by one of the seals thereby to insure against mixing of the two fluids.

14. In an hydraulic braking system for a vehicle having wheel brakes employing respective wheel cylinders, means including a master cylinder and a brake pedal with respective brake lines for applying brake fluid to the wheel cylinders in proportion to the pressure exerted on the pedal for braking the vehicle to a stop, means coupled to each wheel for generating a control signal in response to a relatively slipping condition of incipient skid and which varies in accordance with the degree of slip, a brake release valve having an inlet port connected to the brake line and an outlet port connected to the wheel cylinder, the brake release valve having a plunger biased into a normal position and having signal responsive means for progressively moving the same against the force of bias upon increase in signal level, the inlet port being in direct communication with the outlet port for normal braking when the plunger is in its normal position, the plunger having a valve seat which is closed upon initial movement of the plunger occurring in response to the control signal for closing off the inlet port thereby to isolate the associated brake from the master cylinder, means responsive to further increase in control signal level for progressively permitting flow of brake fluid from the wheel cylinder into the release valve to relieve the pressure in the wheel cylinder thereby to prevent the wheel from going into a full skidding condition and to reduce such degree of slip, a fluid returning check valve bridging the inlet and outlet ports of the release valve so that when the brake pedal is released, pressurized fluid from each of the wheel cylinders is immediately free to return to the brake line without having to flow reversely through the release valve thereby achieving more immediate release of the brake.

* * * * *